United States Patent
Salib et al.

(10) Patent No.: US 7,374,098 B2
(45) Date of Patent: May 20, 2008

(54) CHIP CARD INCLUDING TAMPER-PROOF SECURITY FEATURES

(75) Inventors: Rami Salib, Orléans (FR); Manuel Deloche, Orléans (FR)

(73) Assignee: Axalto S.A., Meudon (FR)

( * ) Notice: Subject to any disclaimer, the term of this patent is extended or adjusted under 35 U.S.C. 154(b) by 39 days.

(21) Appl. No.: 10/564,869

(22) PCT Filed: Jul. 12, 2004

(86) PCT No.: PCT/IB2004/002279

§ 371 (c)(1), (2), (4) Date: Apr. 17, 2006

(87) PCT Pub. No.: WO2005/006247

PCT Pub. Date: Jan. 20, 2005

(65) Prior Publication Data

US 2006/0226238 A1    Oct. 12, 2006

(30) Foreign Application Priority Data

Jul. 15, 2003   (EP)   ................................. 03291741

(51) Int. Cl.
  *G06K 19/06*   (2006.01)
(52) U.S. Cl. ...................................... 235/492; 235/380
(58) Field of Classification Search .............. 235/380, 235/492, 493
  See application file for complete search history.

(56) References Cited

U.S. PATENT DOCUMENTS 3,699,311 A * 10/1972 Dunbar ....................... 235/451
6,068,192 A * 5/2000 McCabe et al. ............. 235/487
6,079,621 A * 6/2000 Vardanyan et al. ......... 235/487
6,095,416 A * 8/2000 Grant et al. ................. 235/449
6,491,215 B1 * 12/2002 Irwin et al. ................. 235/375
6,702,185 B1 * 3/2004 Zercher ....................... 235/488

FOREIGN PATENT DOCUMENTS

FR    2 740 887 A    5/1997
WO    WO 97/22086    6/1997

OTHER PUBLICATIONS

International Search Report dated Oct. 12, 2004 (3 pages).

* cited by examiner

*Primary Examiner*—Thien M. Le
*Assistant Examiner*—Tuyen Kim Vo
(74) *Attorney, Agent, or Firm*—Osha Liang LLP

(57) ABSTRACT

The chip card comprises a card body (10) and a chip module (12) embedded in the card body and incorporating an integrated circuit. The card body includes at least one security feature (20, 22) incorporated in a layer, or applied on a surface, of the card body. An additional tamper-detection layer (26) is provided including a conductive pattern (28) forming an electrical loop connected between terminals of the integrated circuit, said conductive pattern having at least one region located beneath or above said security feature (20, 22). The integrated circuit is adapted to perform an integrity check of said conductive pattern for conditionally performing further operations only in case said integrity is recognized.

13 Claims, 1 Drawing Sheet

CHIP CARD INCLUDING TAMPER-PROOF SECURITY FEATURES

BACKGROUND OF THE INVENTION

1. Field of the Invention

The present invention generally relates to the protection against tampering of security features incorporated in chip cards.

2. Background Art

A chip card comprises a card body and a chip module which is embedded in the card body and incorporates an integrated circuit (IC).

In addition to the embedded IC, so-called "security features" are often present on the surface of the card body. As a matter of fact, since smart cards are often used for authorising certain operations or to personally identify the holder of the card, it is necessary to include in the card some physical features that may be characterised on visual inspection, in contrast to authentication algorithms which rely on the exchange of signals with the microprocessor of the IC.

There has been proposed a number of security features, such as a photograph of the holder of the card, holograms, hologram-like features such as multiple laser images (MLI), laser engraving of individual data such as name and card number, etc. These features are created directly on the card body at the manufacturing stage, or maybe added at a later stage in the course of the personalization step of the blank card.

A problem nevertheless remains in ensuring integrity and security of the card. Though it is generally difficult to modify features as holograms, laser engraving, etc. without blatant alteration of the card, there exists some simple frauds consisting e.g. in peeling as a whole a layer of the card to replace printed or engraved information, still keeping unchanged the other layers of the cards and the chip module. Photographs printed on a card, like on driving licenses, passport, etc. are usually the first targets of such physical attacks.

Another attack consists in keeping the card body with all its security features as such, but removing the chip module and replacing it by a counterfeited module or a module taken from another card.

In order to make such physical attacks more difficult or render them more apparent in case of alteration of the card, multiple, different security features are incorporated in a single card and/or more and more sophisticated security features are used.

However, this makes the manufacturing process more complex and more expensive, while remaining vulnerable to some kinds of physical attacks such as exchanging the IC or peeling as a whole the layer incorporating the different security features. Thus the security features proposed so far, despite their sophistication, are not really tamper-proof and are still open to some kind of physical attacks.

SUMMARY OF THE INVENTION

It is therefore an object of the invention to provide a chip card protected against any physical attacks applied to a card containing security features, which can work as a tamper-proof feature making the card irreversibly non-functional in case of any attempt of such kind of fraud.

Another object of the invention is to provide such a tamper-proof chip card which may be manufactured through conventional manufacturing processes, and in a way cheaper than most security features like holograms or laser engraving.

A further object of the invention is to provide such a chip card enabling a reduction of the number of different security features needed to protect the card and the IC, hence with a lower manufacturing cost.

A still further object of the invention is to provide such a chip card which may be protected at once against both physical attacks like layer peeling and IC exchange.

A still further object of the invention is to provide a chip card in which the protection is obtained through incorporation of features which are invisible or near invisible to human eye in daylight, making it difficult to detect when the card is visually inspected in daylight.

More specifically, the invention provides a chip card comprising a card body and a chip module embedded in the card body and incorporating an integrated circuit, said card body including at least one security feature incorporated in a layer, or applied on a surface, of the card body.

According to the invention, the card body comprises an additional tamper-detection layer including a conductive pattern forming an electrical loop connected between terminals of the integrated circuit, the conductive pattern having at least one region located beneath or above the security feature. Further, the integrated circuit is adapted to perform an integrity check of the conductive pattern for conditionally performing further operations only in case said integrity is recognized.

The conductive pattern having a given impedance or resistance, the integrated circuit may be adapted to check whether said impedance or resistance matches a predetermined value stored in a memory of the integrated circuit.

In case said chip card includes contactless communication features, the conductive pattern may be part of a tuned circuit co-operating with the integrated circuit for contactless communication.

The security feature may be one from the group including photograph, hologram, multiple laser image, laser engraving, UV/IR-readable pattern and magnetically-readable encoding.

Preferably, the conductive pattern is made from a conductive ink material and from a transparent or near transparent material. It is advantageously connected to the terminals of the integrated circuit through permanent bonds.

BRIEF DESCRIPTION OF THE DRAWINGS

The foregoing and other objects, aspects and advantages of the invention will be better understood from the following detailed description of a preferred embodiment of the invention with reference to the appended drawings, in which the same numerals refer to identical or functionally similar features over the different figures.

DETAILED DESCRIPTION OF A PREFERRED EMBODIMENT OF THE INVENTION

Figure 1:
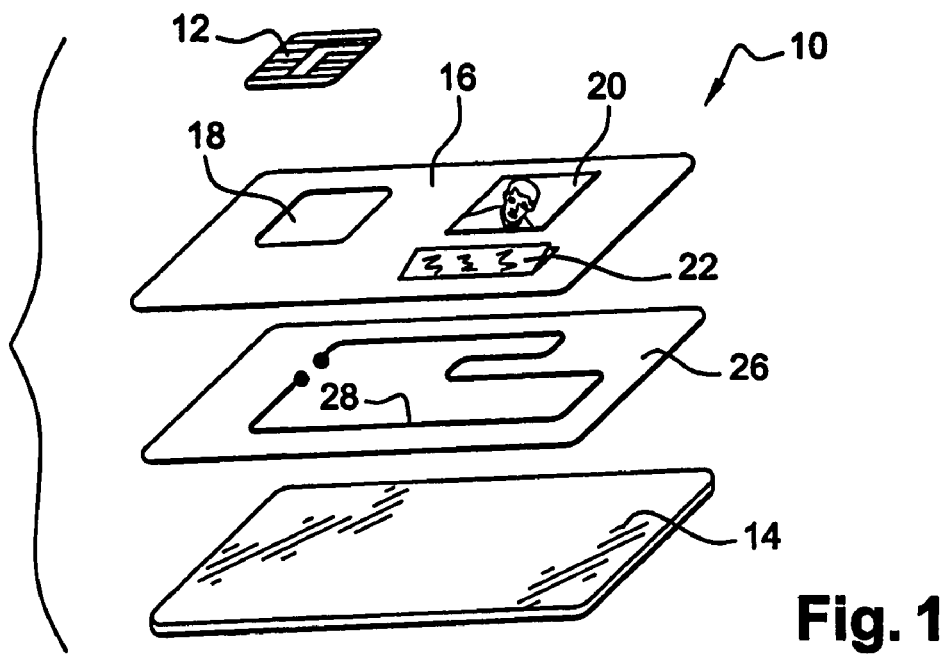
FIG. 1 is a schematic, exploded view of a card incorporating the security feature according to the invention.

Referring now to the drawings, FIG. 1 illustrates an exemplary embodiment of a card incorporating the security features of the invention.

This card comprises a card body 10 and a chip module 12 including an IC, typically an IC with a microprocessor-based chip allowing inter alia execution of suitable authentication, decryption, etc. algorithms for the preliminary identification of the user of the card.

The most common process for manufacturing a chip body is by lamination of a plurality of layers each made from a plastic foil. Card body 10 at least includes a base layer 14 and an upper layer 16 with a hole 18 punched or milled in order to form a recess for receiving the chip module 12.

The upper layer 16 includes one or several so-called "security features" such as a photograph 20 of the authorized user of the card, or personal identification data written by laser engraving 22. There exist a number of other security features, which are all well-known from the man skilled in the art such as holograms, multiple laser image, patterns or characters which are not visible under normal daylight but become apparent under UV or IR light, magnetically-readable encoding, etc. All such "security features" are features which are only of a physical nature, as opposed to identification, authentication and like functionalities involving processing of data by the IC incorporated in chip module 12.

The invention essentially lies in the incorporation in the card body of an additional layer 26, hereafter called "security layer", enabling detection of any alteration of the security features present on upper layer 16, attempts of peeling upper layer 16, or removal of the chip module 12 from the card in the case of fraud by IC exchange.

Figure 2:
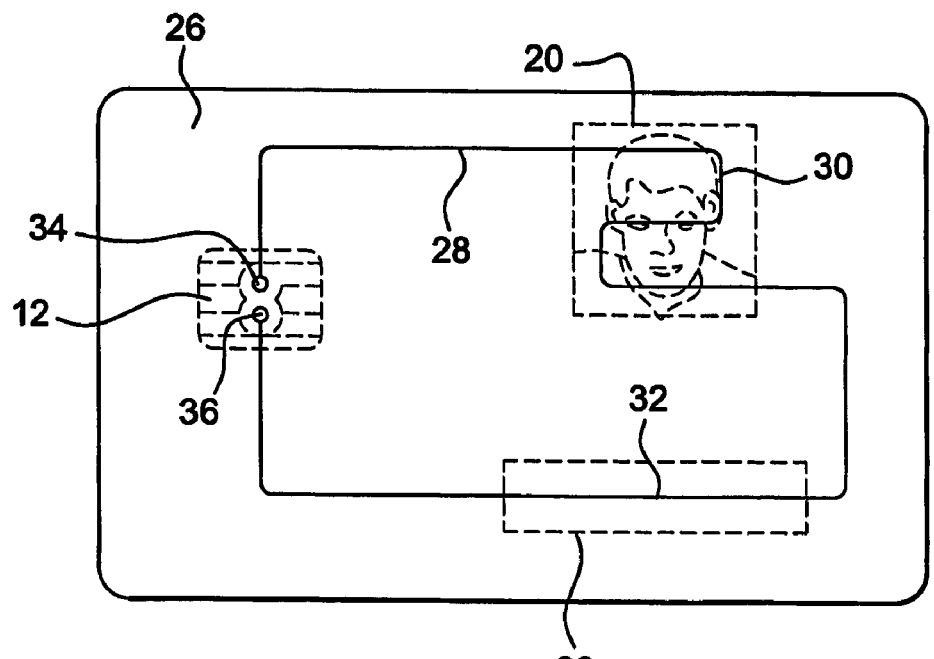
FIG. 2 is a plan view of the specific security layer of the card of FIG. 1.

As better shown on FIG. 2, security layer 26 includes a conductive pattern 28 forming a pathway running on the surface of layer 26 and having regions such as 30 and 32 which are located beneath security features 20 and 22 (shown in broken lines) of upper layer 16.

Conductive pattern 28 forms an electrical loop between end pads 34, 36 which are connected by suitable means to terminals of the IC embedded in module 12.

Basically, conductive pattern 28 acts as a switch that permanently and irreversibly deactivates the IC in case the circuit is broken due to fraudulent peeling of upper layer 16 or removal of chip module 12.

Preferably, conductive pattern 28 is devised with specific electrical properties such as a given impedance or resistance, the IC being adapted to check whether said impedance or resistance matches a predetermined value stored in a memory of the IC.

For instance, peeling off the upper layer 16 will alter these electrical properties, which will not longer match the value stored within the IC, blocking any proper operation of the latter.

It is in particular possible to customize conductive pattern 28 in order to modify the electrical properties from one batch to the other and load the corresponding value in the IC memory during personalisation of the card, so that any attempt to exchange the module will result in a mismatch making IC operation impossible.

In case of contactless systems, or hybrid contact/contactless systems, conductive pattern 28 may constitute an antenna being part of a tuned circuit involved in contactless operation.

Many variants of the invention may be considered, and the above description is just given by way of example.

For instance, security layer 26 is not necessary located below layer 16 bearing security features to be protected. In other embodiments, the security layer may as well overlay the security features, the conductive pattern being in this case preferably made from a transparent or near transparent material.

Conductive pattern 28 may be formed from any known material. Preferably, it is made from conductive ink, which makes it easy to form by conventional techniques such as screen printing. There exist a number of conductive materials such as conductive polymer resins. The material and arrangement of pattern 28 may be chosen so as to be invisible or nearly invisible to human eye in daylight, making it difficult to detect thereof. Transparent or clear conductive material may be used, or may be devised In order to make it hardly visible, for instance a grey pattern applied on grey layer background.

Security layer 26 may be provided for as a layer added in the course of the lamination process, whenever the card is manufactured this way. However, this is not restrictive and the security layer may be used in conjunction with cards made by other manufacturing processes, for instance the security layer may be added onto a moulded card body before, or during, the personalization stage.

The invention claimed is:

1. A chip card, comprising:
a card body, and
chip module embedded in said card body and incorporating an integrated circuit, said card body including at least one security feature incorporated in a layer, or applied on a surface, of the card body,
wherein said card body comprises an additional tamper-detection layer including a conductive pattern forming an electrical loop connected between terminals of the integrated circuit, said conductive pattern having at least one region located beneath or above said security feature, and
wherein said integrated circuit is adapted to perform an integrity check of said conductive pattern for conditionally performing further operations only in case said integrity is recognized.

2. The chip card as in claim 1, wherein said conductive pattern has a given impedance or resistance and said integrated circuit is adapted to check whether said impedance or resistance matches a predetermined value stored in a memory of the integrated circuit.

3. The chip card as in claim 1, wherein said chip card includes contactless communication features and said conductive pattern is part of a tuned circuit co-operating with said integrated circuit for contactless communication.

4. The chip card as in claim 1, wherein said at least one security feature is a feature from the group including photograph, hologram, multiple laser image, laser engraving, UV/IR-readable pattern and magnetically-readable encoding.

5. The chip card as in claim 1, wherein said conductive pattern is made from a conductive ink material.

6. The chip card as in claim 1, wherein said conductive pattern is made from a transparent or near transparent material.

7. The chip card as in claim 1, wherein said conductive pattern is connected to said terminals of the integrated circuit through permanent bonds.

8. A chip card, comprising:
a base layer;
an upper layer comprising an integrated circuit, wherein at least one security feature is located on the upper layer; and
a security layer interposed between the base layer and the upper layer,
wherein the security layer comprises a conductive pattern forming an electrical loop connected between end pads in the security layer, wherein at least one portion of the conductive pattern is located below the at least one security feature, and wherein the conductive pattern is configured to deactivate the integrated circuit when the integrity of the electrical loop is compromised.

9. The chip card of claim 8, wherein the conductive pattern has a given impedance or resistance that is compared with a predetermined value stored in a memory of the integrated circuit for the integrity verification made by the integrated circuit.

10. The chip card of claim 8, wherein the end pads are connected to terminals of the integrated circuit.

11. The chip card as of claim 8, wherein the conductive pattern is made from a conductive ink material.

12. The chip card of claim 11, wherein said conductive pattern is made from a transparent material.

13. The chip card of claim 11, wherein said conductive pattern is made from a near transparent material.

\* \* \* \* \*